(12) United States Patent
Miele et al.

(10) Patent No.: US 10,027,160 B2
(45) Date of Patent: Jul. 17, 2018

(54) INTEGRATION OF WIRELESS CHARGING COIL TO A CHASSIS

(71) Applicant: INTEL CORPORATION, Santa Clara, CA (US)

(72) Inventors: Ralph V. Miele, Hillsboro, OR (US); David G. Payne, Beaverton, OR (US); Brandon Courtney, Hillsboro, OR (US); Isaac A. Simpson, Beaverton, OR (US); Andrew Larson, Hillsboro, OR (US); David Pidwerbecki, Hillsboro, OR (US); Patrick Chewning, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 15/081,341

(22) Filed: Mar. 25, 2016

(65) Prior Publication Data

US 2017/0279291 A1   Sep. 28, 2017

(51) Int. Cl.
   *H02J 7/02*   (2016.01)
   *H04B 5/00*   (2006.01)

(52) U.S. Cl.
   CPC ............ *H02J 7/025* (2013.01); *H04B 5/0037* (2013.01)

(58) Field of Classification Search
   CPC ................................... H02J 7/02; H04B 5/00
   USPC ........................................................ 320/108
   See application file for complete search history.

(56) References Cited

U.S. PATENT DOCUMENTS

| | | | |
|---|---|---|---|
| 8,884,581 B2 * | 11/2014 | Widmer et al. | B60L 11/182 320/104 |
| 9,614,385 B2 * | 4/2017 | Oo et al. | H02J 7/0044 |
| 9,637,014 B2 * | 5/2017 | Schneider et al. | B60L 11/182 |
| 9,769,558 B2 * | 9/2017 | Chandramohan et al. | H04R 1/1041 |
| 9,772,401 B2 * | 9/2017 | Widmer et al. | G01S 13/04 |
| 2009/0001929 A1 | 1/2009 | Posamentier | |
| 2011/0254503 A1 * | 10/2011 | Widmer et al. | B60L 11/182 320/108 |
| 2015/0311955 A1 | 10/2015 | Lu et al. | |
| 2015/0318731 A1 | 11/2015 | Rakoczy et al. | |
| 2015/0326054 A1 | 11/2015 | Park et al. | |
| 2015/0326063 A1 | 11/2015 | Leabman | |
| 2015/0349578 A1 | 12/2015 | Hu | |
| 2016/0380480 A1 * | 12/2016 | Yang et al. | H02J 50/70 307/104 |

\* cited by examiner

*Primary Examiner* — Sun Lin
(74) *Attorney, Agent, or Firm* — Schwabe, Williamson & Wyatt, P.C.

(57) ABSTRACT

A method is provided for forming a wireless charging electronic device. An embodiment of the method includes integrating a coil and a collector plate to a chassis of the electronic device to wirelessly charge the electronic device.

19 Claims, 11 Drawing Sheets

INTEGRATION OF WIRELESS CHARGING COIL TO A CHASSIS

BACKGROUND

1. Field

Embodiments may relate to an electronic device having wireless charging components.

2. Background

An electronic device may have a plurality of functions, and may involve a lot of data. One trend for electronic devices is to have a thin design. However, the thin design may constrain a battery capacity of the electronic device. When the electronic device has low power, then the battery of the electronic device may be connected to a power source using a wired connection. As one example, the electronic device may be plugged into a power outlet using a charging adapter. The electronic device may also be charged using wireless charging from a charging device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details. Further, features of one embodiment may be combined with features of another embodiment.

As used hereinafter, the words "wireless power" may be used to relate to any form of energy associated with electric fields, magnetic fields, electromagnetic fields, or otherwise that is transmitted from a transmitting device to a receiving device without use of physical conductors.

Wireless charging may include charging of an electronic device (or electronic apparatus). The electronic device may any one of a wide variety of battery powered devices including mobile terminals, such as personal digital assistants (PDAs), pagers, mobile televisions, mobile telephones, smartphones, gaming devices, laptop computers, tablet computers, cameras, camera phones, video recorders, audio/video players, radios, global positioning system (GPS) devices, navigation devices, and/or any combination of the aforementioned.

Embodiments may include an electronic device having a chassis and wireless charging components integrated into the chassis. The integration of the wireless charging components within the chassis may reduce a Z-height of the electronic device. For example, a wireless charging coil, a ferrite layer and/or a controller board (or circuitry) and/or a collector plate may be directly integrated into a chassis of the electronic device. A power receiving unit that includes at least the charging coil and the collector plate may be integrated into the chassis.

Embodiments may integrate the wireless charging coil directly into the chassis of an electronic device (such as a tablet or mobile computing device).

Wireless charging may involve the charging of the electronic device or system by receiving a wireless charge (or wireless power) from another device or system. The charging device (or transmitting device) may include an inductive coil to provide wireless power to at least one inductive coil of the electronic device or system (i.e., the receiving device). The received power may be stored in a battery, for example.

Figure 1A:
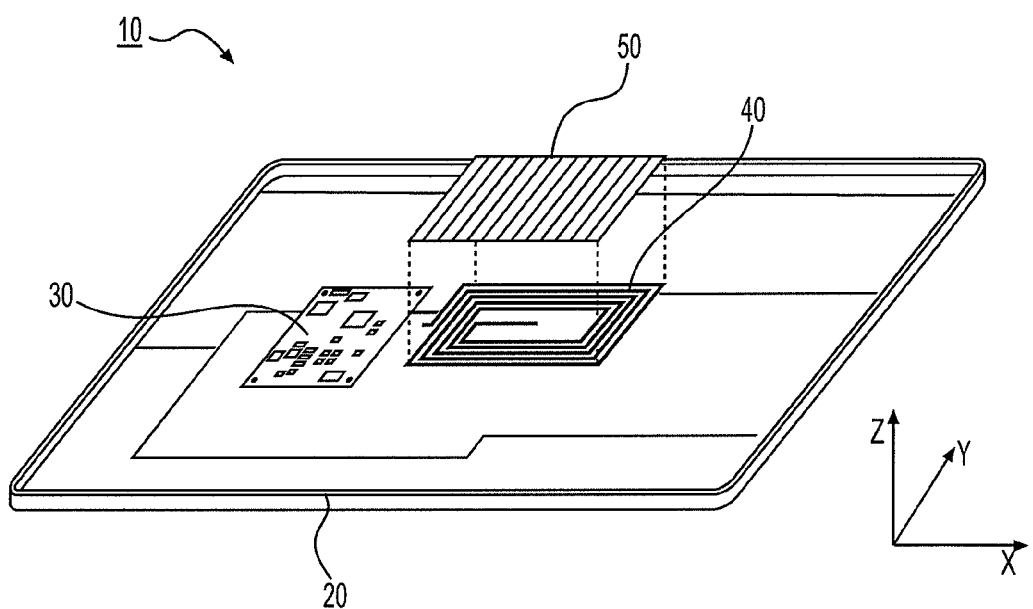
FIG. 1A shows a chassis of an electronic system for wireless charging according to an example arrangement.

FIG. 1A shows a chassis of an electronic system for wireless charging according to an example arrangement. Other configurations and arrangements may also be provided.

As one example, the following may relate to an electronic device or system such as a laptop computer that includes a base component and a lid component. FIG. 1a shows the base component of the laptop computer. However, the configuration of FIG. 1A and the other drawings may be directed to other types of electronic devices and/or systems.

More specifically, FIG. 1A shows a base 10 of an electronic system. The base 10 provides support for components to perform wireless charging. The base 10 may include a chassis 20 to support wireless charging components as well as other components. The chassis 20 may also be called a casing, a skin, a chassis skin and/or a D-cover.

In one arrangement, the chassis 20 may be made of plastic or metal, for example. The chassis 20 may include an electromagnetic interference (EMI) shielding coating on an inner side of the chassis 20. In one arrangement, the chassis 20 may be formed of metal to even thermal spreading and remove (or reduce) localized hot spots on the chassis 20.

FIG. 1A shows wireless charging components such as a controller board 30, a charging coil 40 and a ferrite layer 50 (or ferrite unit). For ease of illustration, the ferrite layer 50 is shown separated from the charging coil. A collector plate may also be provided at the chassis. The controller board 30, the charging coil 40 and the ferrite layer 50 may be grouped together as a single module (or as a single unit or device). In at least one embodiment, the collector plate may be grouped as the single module (along with the controller board 30, the charging coil 40 and the ferrite layer 50). The controller board 30, the charging coil 40 and the ferrite layer 50 may collectively be referred to as a power receiving unit (PRU). The power receiving unit may also be referred to as a power receiving device, a power receiving component and/or a power receiving module.

Figure 1B:
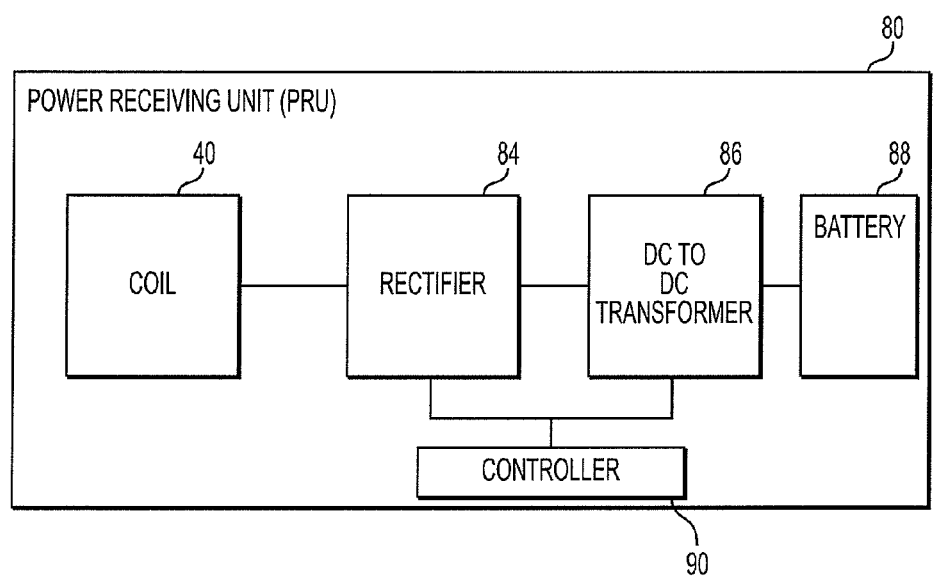
FIG. 1B shows a power receiving unit (PRU) for wireless charging according to an example embodiment

FIG. 1B shows a power receiving unit for wireless charging according to an example embodiment. Other configurations and embodiments may also be provided.

A power receiving unit (PRU) 80 may include components to receive power (or wireless power) from a power transmitting unit (PTU). The PRU 80 may receive the power and store power in a battery, for example. The stored power may be used to power a load, for example. The PRU 80 may be provided within the chassis 20.

As shown in FIG. 1B, the PRU 80 may include the coil 40, a rectifier 84, a direct current-to-direct current (DC-to-DC) transformer 86, a battery 88 and a controller 90. Other components may also be provided as part of the PRU 80.

The rectifier 84, the DC-to-DC transformer 86 and the controller 90 may be provided on a PRU circuit board (such as the controller board 30).

The coil 40 may be a receiving (Rx) resonator that performs magnetic resonant coupling at 6.78 MHz. The magnetic resonant coupling may be with a transmitting (Tx) resonator of the power transmitting unit (PTU).

The received power may be provided from the coil 40 (i.e., the Rx resonator) to the rectifier 84. The rectifier 84 may be an AC-DC rectifier to convert the received AC to DC. The rectifier 84 may be controlled by the controller 90. The rectifier 84 may provide the DC voltage to the DC-to-DC transformer 86.

The DC-to-DC transformer 86 may be controlled by the controller 90. The DC-to-DC transformer 86 may modify the DC voltage to achieve a correct voltage for charging the battery 88. The DC-to-DC transformer 86 may provide the modified DC voltage to the battery 88. The battery 88 may store a DC voltage. The battery 88 may be used to power electronic components. For example, the battery 88 may provide power to any electronic component at the chassis 20 or other portions of the electronic device or system. The battery 88 may provide power to a load of the electronic device or system.

The battery 88 (or battery port) may be provided at the chassis 20 to receive power from the charging coil.

The controller 90 (of the PRU 80) may control the rectifier 84 and the DC-to-DC transformer 86. The controller 90 may wirelessly communicate with a controller of the power transmitting unit (PTU). For example, the controller 90 may communicate using a Bluetooth enabled low energy control channel at 2.4 GHz.

The charging coil 40 may be referred to as a receiving coil. The coil may be made of copper, for example. The charging coil may be an electromagnetic induction coil that converts electric energy received from a transmitting circuit (or transmitting coil) into electromagnetic induction energy.

The ferrite layer 50 is to be provided on the charging coil. However, for purposes of illustration, FIG. 1A shows the ferrite layer 50 separated from the charging coil 40.

The ferrite layer 50 may prevent a magnetic field from progressing further into the electronic system. For example, the ferrite layer 50 may prevent a magnetic field of the charging coil from entering into other components of the electronic system (such as to a lid).

In at least one arrangement, an insulating layer may be provided between the charging coil 40 and the ferrite layer 50. The insulating layer may prevent an electrical connection between the charging coil 40 and the ferrite layer 50.

The controller board 30 may be a circuit board (or PRU circuit board) that supports components to operate the charging coil 40. The controller board 30 may be a flexible printed circuit board (PCB). In at least one embodiment, the controller board 30 may have a Bluetooth module that communicates with a charging mat, a rectifier to convert the AC voltage (from the charging coil) to a DC voltage, and a DC-DC transformer to provide a correct voltage (or modified voltage) for charging. For example, the voltage for charging may vary based on proximity to a transmitting coil (such as from a PTU).

The structure shown in FIG. 1A may also include a collector plate on the chassis that surrounds the charging coil 40. The collector plate may be substantially planar with the charging coil 40.

Figure 2:
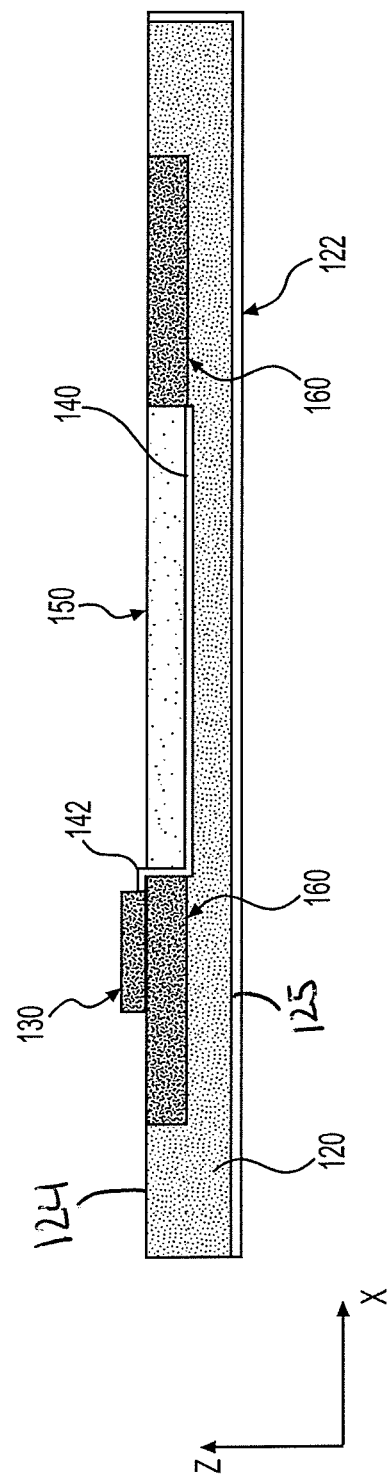
FIG. 2 is a side view of a chassis and wireless charging components according to an example embodiment.

FIG. 2 is a side view of a chassis according to an example embodiment. Other embodiments and configurations may also be provided.

More specifically, FIG. 2 shows a chassis 120, a controller board 130, a charging coil 140, a ferrite layer 150 (or ferrite unit) and a collector plate 160. The chassis 120 may have a first surface 124 that defines a first plane (or top plane) and a second surface 125 that defines a second plane (or bottom plane). The chassis 120 may include a cosmetic surface 122 on the second surface 125. The cosmetic surface 122 may be a surface that is exposed to a user of the electronic device. The cosmetic surface 122 may be an outer part of the chassis.

FIG. 2 shows the wireless charging components embedded and/or integrated into the chassis 120. More specifically, FIG. 2 shows a result of direct insert molding of the power receiving unit (PRU) into the chassis 120. This may result in a thinner chassis in the Z-direction. A reduction of the Z-height may be beneficial in order to make thinner electronic devices. Embodiments may provide a reduction in Z-height as compared to disadvantageous arrangements. At least one advantage to a reduction in Z-height may be an increased amount of real estate in order to provide a battery or battery pack.

As shown in FIG. 2, the coil 140 is provided at the chassis between the first plane and the second plane. Additionally, the collector plate 160 is provided between the first plane and the second plane.

The chassis 120 may be formed by injection molding. The wireless charging components may be injection molded into the chassis 120. For example, the charging coil 140 and the collector plate 160 may be provided within (or integrated to) the chassis 120. The controller board 130 may be provided within (or integrated to) the chassis 120. In at least one embodiment, the controller board 130 may be provided on the collector plate 160. In at least one embodiment, the controller board 130 may be provided above the first plane defined by the first surface 124. Additionally, the ferrite layer 150 may be provided on the charging coil 140 (within the chassis 120) and below the first place defined by the first surface 124. As shown in FIG. 2, the charging coil 140 may be connected to the controller board 130 by a connector 142. The connector 142 may be an extension of the coil 140 to components of the controller board 130. The connector 142 (or connection) may include soldered wires or a surface mount electrical connector.

As shown in FIG. 2, the coil 140 and the collector plate 160 may be integrated into the chassis 120. More specifically, portions of the coil 140 and the collector plate 160 may be below the first place (defined by the first surface 124) of the chassis 120.

Figure 3:
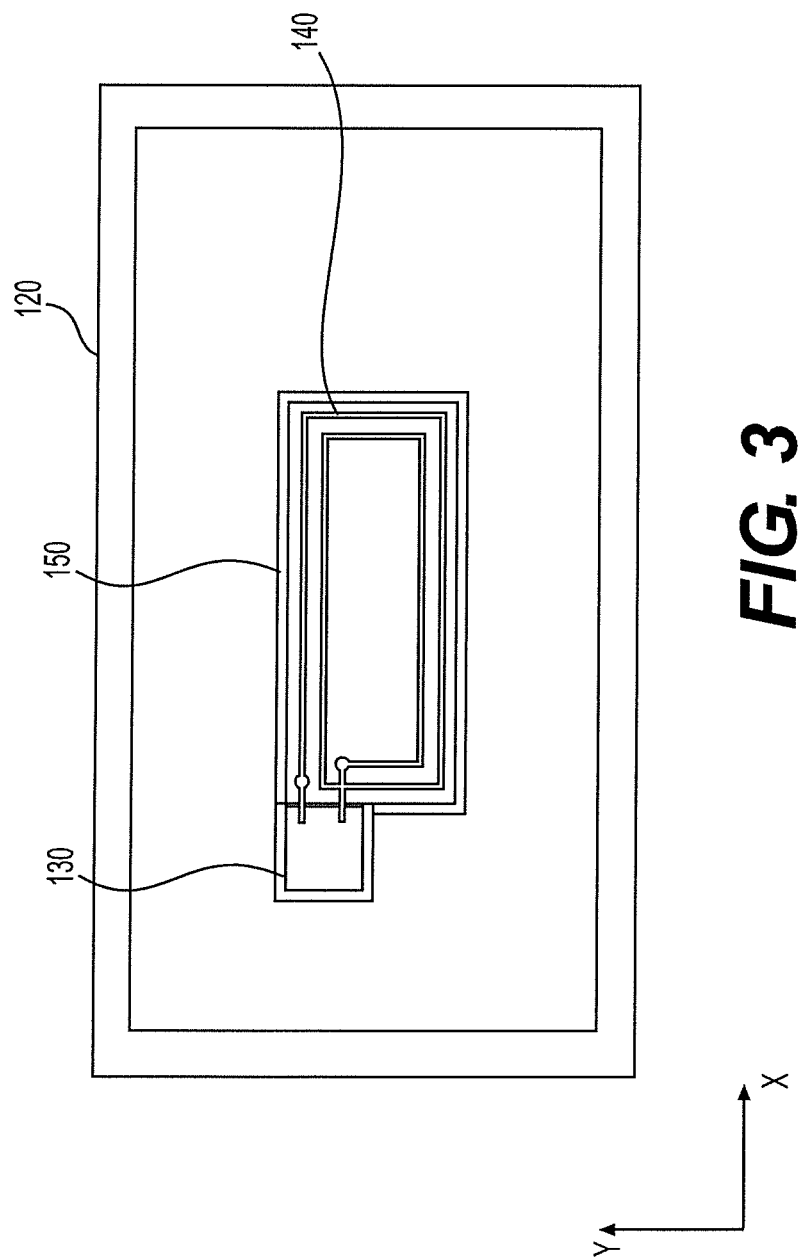
FIG. 3 is a top transparent view of a chassis and wireless charging components according to an example embodiment.

FIG. 3 is a top transparent view of a chassis according to an example embodiment. Other embodiments and configurations may also be provided. The FIG. 3 embodiment corresponds to the FIG. 2 embodiment.

FIG. 3 shows the chassis 120 that supports the components of the power receiving unit. The chassis 120 supports at least the controller board 130, the charging coil 140, the ferrite layer 150 and the collector plate 160. The components (the controller board 130, the charging coil 140, the ferrite layer 150 and the collector plate 160) are injection molded into the chassis 120. In at least one embodiment, at least the coil 140 and the collector plate 160 are injection molded into the chassis 120. Thus, the coil 140 and the collector plate 160 are integrated into the chassis 120. In at least one embodiment, the ferrite layer 150 and/or the controller board 130 may be provided after the injection molding.

The chassis 120 may be an injection-molded plastic chassis, for example.

Figure 4:
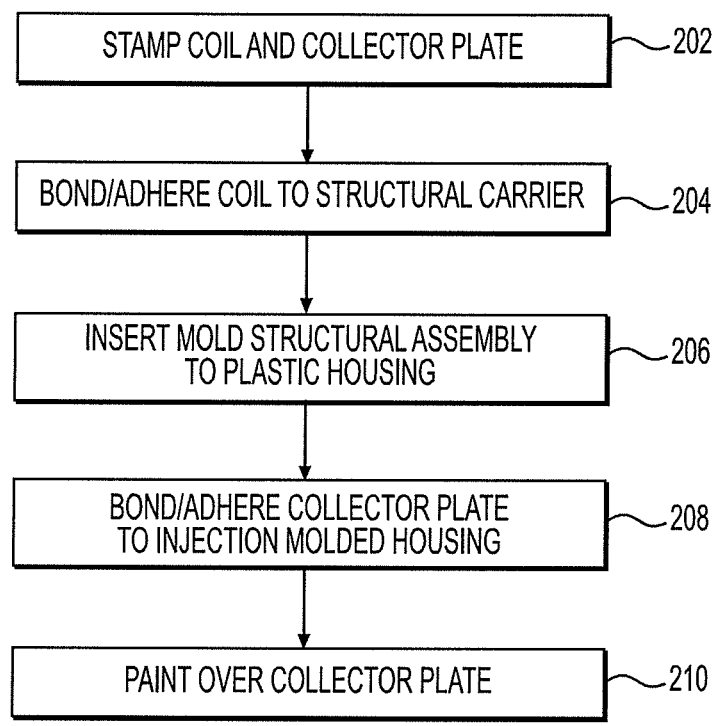
FIG. 4 is a flowchart showing an injection molding method for integration of a wireless charging coil to a chassis according to an example embodiment.

FIG. 4 is a flowchart showing an injection molding method for integration of wireless charging coil to a chassis according to an example embodiment. Other operations, orders of operations and embodiments may also be provided.

More specifically, FIG. 4 shows a plurality of operations to obtain an integrated chassis structure such as shown in FIGS. 2-3.

In operation 202, a coil may be stamped, and a collector plate may be stamped. The coil and the collector plate may be stamped using copper.

In operation 204, the stamped coil may be bonded (or adhered) to a structural carrier. The structural carrier is a non-conductive material. This may form a structural assembly. The structural carrier may be a heat resistant non-conductive material, such as polymide.

In operation 206, the structural assembly (that includes the coil on the structural carrier) may be insert molded to a plastic housing (such as the chassis). This may form an injection molded housing. The coil is thereby integrated to the chassis. In operation 208, the collector plate may be bonded (or adhered) to the injection molded housing. The collector plate is thereby integrated to the chassis.

In operation 210, paint may be applied on (or over) the collector plate. This may hide the collector plate from view.

The controller board and the ferrite layer may then be provided over the integrated structure that includes the coil and the collector plate bonded (or adhered) to the injection molded housing. In at least one embodiment, the controller board and/or the ferrite layer may be provided to the structure at a different time point. In at least one embodiment, the ferrite layer and/or the controller board may be either assembled to the insert mold structural assembly prior to the insert molding. Alternatively, the ferrite layer and/or the controller board may be assembled to the insert mold structural assembly after the insert molding.

The result of operations 202-210 may be the integrated chassis structure shown in FIGS. 2-3.

Figure 5:
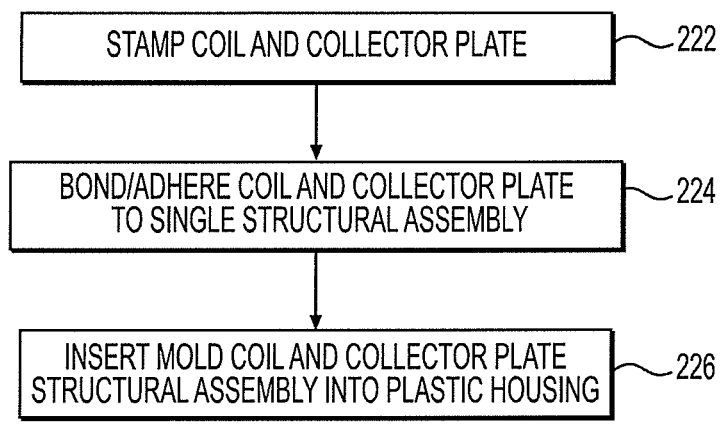
FIG. 5 is a flowchart showing an injection molding method for integration of a wireless charging coil to a chassis according to an example embodiment.

FIG. 5 is a flowchart showing an injection molding method for integration of wireless charging coil to a chassis according to an example embodiment. Other operations, orders of operations and embodiments may also be provided.

More specifically, FIG. 5 shows a plurality of operations to obtain an integrated chassis structures such as shown in FIGS. 2-3.

In operation 222, a coil may be stamped, and a collector plate may be stamped. The coil and the collector plate may be stamped using copper.

In operation 224, the coil and the collector plate may be bonded (or adhered) to a single structural assembly. This may be called a coil and collector plate structural assembly.

In operation 226, the coil and collector plate structural assembly may be insert molded to a plastic housing (such as the chassis). The coil and the collector plate are thereby integrated to the chassis.

The controller board and the ferrite layer may then be provided over the integrated structure that includes the coil and collector plate structural assembly insert molded to the chassis. In at least one embodiment, the controller board and/or the ferrite layer may be provided to the structure at a different time point. In at least one embodiment, the ferrite layer and/or the controller board may be either assembled to the insert mold structural assembly prior to the insert molding. Alternatively, the ferrite layer and/or the controller board may be assembled to the insert mold structural assembly after the insert molding.

The result of operations 222-226 may be the integrated chassis structure shown in FIGS. 2-3.

Figure 6:
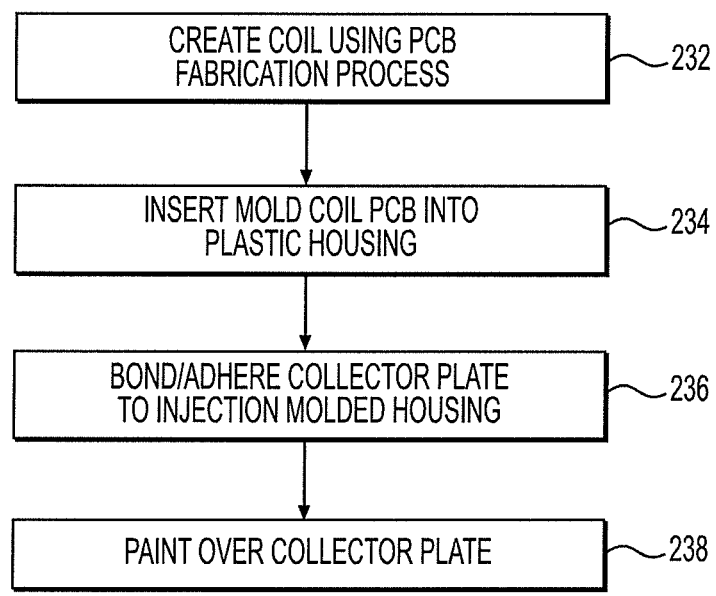
FIG. 6 is a flowchart showing an injection molding method for integration of a wireless charging coil to a chassis according to an example embodiment.

FIG. 6 is a flowchart showing an injection molding method for integration of wireless charging coil to a chassis according to an example embodiment. Other operations, orders of operations and embodiments may also be provided.

More specifically, FIG. 6 shows a plurality of operations to obtain an integrated chassis structure such as shown in FIGS. 2-3.

In operation 232, a coil may be created using a printed circuit board (PCB) fabrication process. This may form a coil PCB.

In operation 234, the coil PCB may be insert molded into a plastic housing (such as a chassis). The coil may thereby be integrated to the chassis.

In operation 236, the collector plate may be bonded (or adhered) to the injection molded housing. The collector plate may thereby be bonded to the chassis.

In operation 238, paint may be applied on (or over) the collector plate. This may hide the collector plate from view.

The controller board and the ferrite layer may then be provided over the integrated structure that includes the coil and the collector plate bonded (or adhered) to the injection molded housing. In at least one embodiment, the controller board and/or the ferrite layer may be provided to the structure at a different time point. In at least one embodiment, the controller board and the coil may be a single PCB assembly. In at least one embodiment, the controller board may be separate PCB assemblies. If the controller board is a separate assembly, then the controller PCB and the ferrite layer may be assembled either prior to injection molding the housing or after injection molding the housing.

The result of operations 232-238 may be the integrated structure shown in FIGS. 2-3.

Figure 7:
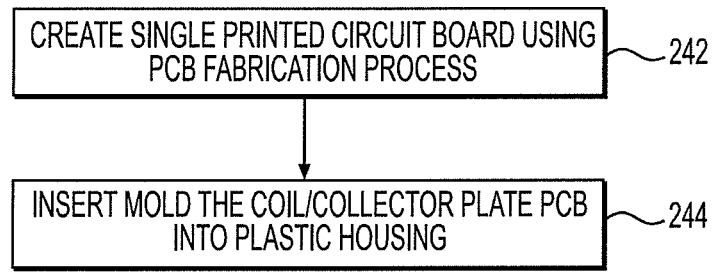
FIG. 7 is a flowchart showing an injection molding method for integration of a wireless charging coil to a chassis according to an example embodiment

FIG. 7 is a flowchart showing an injection molding method for integration of wireless charging coil to a chassis according to an example embodiment. Other operations, orders of operations and embodiments may also be provided.

More specifically, FIG. 7 shows a plurality of operations to obtain an integrated chassis structure such as shown in FIGS. 2-3.

In operation 242, a single printed circuit board may be created using a PCB fabrication process. The coil, the controller board, and the collector plate may be all combined into a single PCB that is insert molded during the injection molding process.

In operation 244, the coil and collector plate PCB may be insert molded into the plastic housing (such as the chassis). The coil and the collector plate are thereby integrated to the chassis.

The controller board and the ferrite layer may then be provided over the integrated structure that includes the coil and the collector plate insert molded to the chassis. In at least one embodiment, the controller board and/or the ferrite layer may be provided to the structure at a different time point. In at least one embodiment, the ferrite layer and/or the controller board may be assembled to the insert mold structural assembly prior to insert molding. Alternatively in at least one embodiment, the ferrite layer and/or the controller board may be assembled to the insert mold structural assembly after the insert molding.

The result of operations 232-238 may be the integrated structure shown in FIGS. 2-3.

Figure 8:
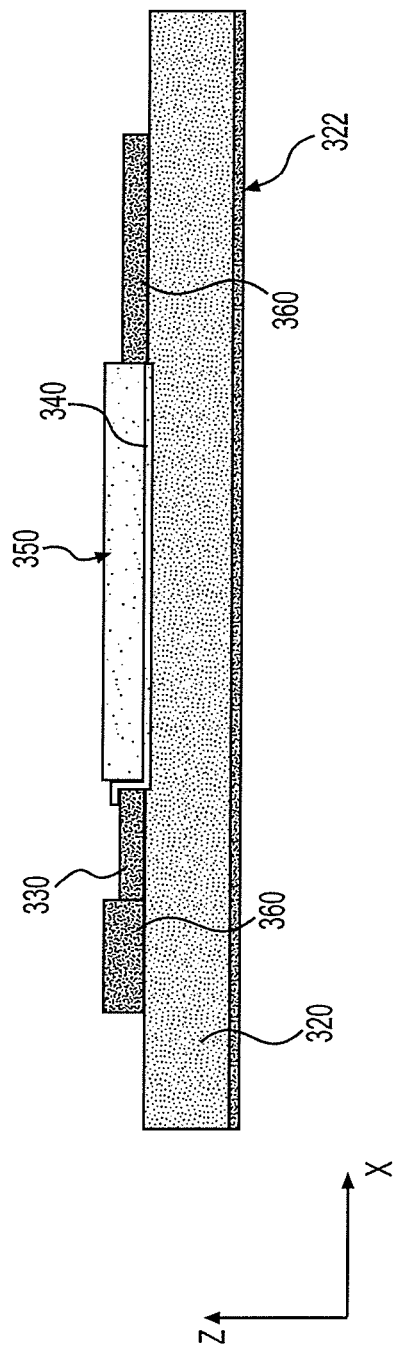
FIG. 8 is a side view of a chassis and wireless charging components according to an example embodiment.

FIG. 8 is a side view of a chassis according to an example embodiment. Other embodiments and configurations may also be provided.

Embodiments may use metal deposition (or electroplating) to integrate the charging coils directly onto the chassis. More specifically, FIG. 8 shows a chassis 320, a controller board 330, a charging coil 340, a ferrite layer 350 (or ferrite unit) and a collector plate 360. The chassis 320 may include a cosmetic surface 322. The cosmetic surface 322 may be a surface that is exposed to a user of the electronic device. The cosmetic surface 322 may be an outer part of the chassis.

FIG. 8 shows that the charging coil 340 is provided on an internal surface of the chassis 320. The charging coil 340 may be connected to the controller board 330 by a connector device.

FIG. 8 also shows the controller board 330 and the ferrite layer 350 on an interior surface (or inner surface) of the chassis 320.

Figure 9:
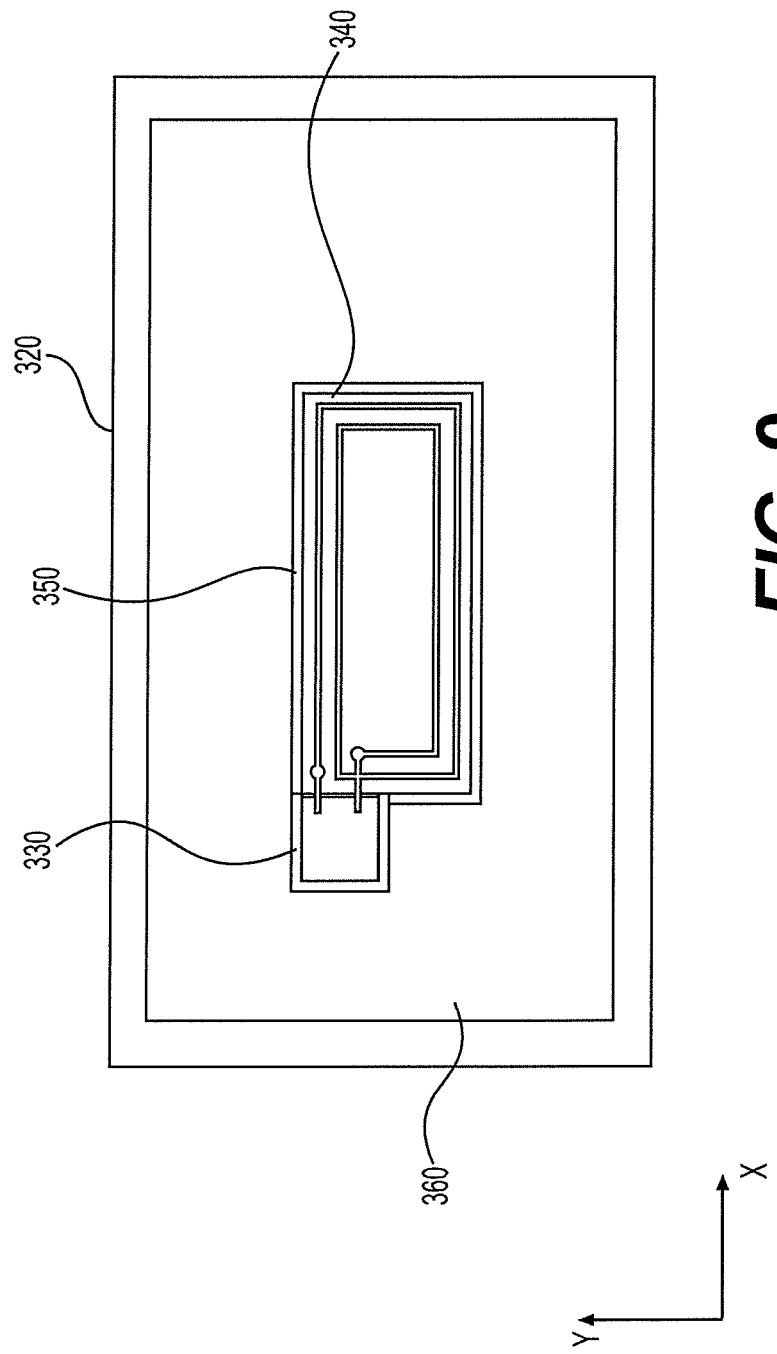
FIG. 9 is a top transparent view of a chassis and wireless charging components according to an example embodiment.

FIG. 9 is a top transparent view of a chassis according to an example embodiment. Other embodiments and configurations may also be provided. The FIG. 9 embodiment corresponds to the FIG. 8 embodiment.

FIG. 9 shows the chassis 320 that supports the components of the power receiving unit. The chassis 320 supports at least the controller board 330, the charging coil 340, the ferrite layer 350 and the collector plate 360. In at least one embodiment, the coil and the collector plate may be provided by metal deposition (or electroplating) to the chassis. In at least one embodiment, the ferrite layer 350 and the collector plate 360 may be provided after the metal deposition.

FIGS. 8 and 9 show that metal deposition may be used to integrate the charging coil 340 directly onto an internal surface of the chassis.

Figure 10:
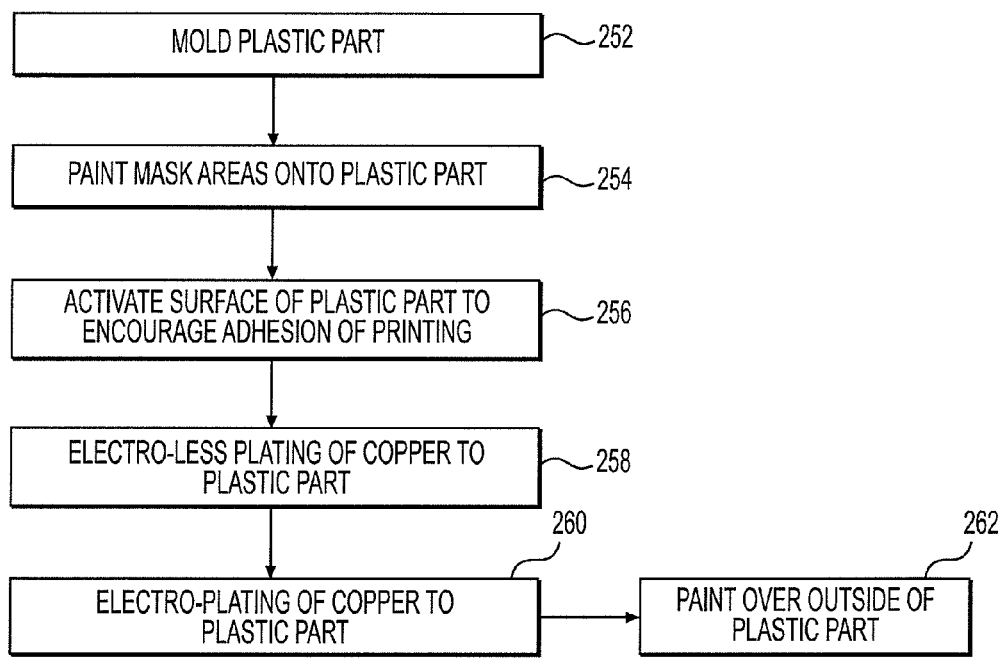
FIG. 10 is a flowchart showing a metal deposition method for integration of a wireless charging coil to a chassis according to an example embodiment.

FIG. 10 is a flowchart showing a metal deposition method for integration of wireless charging coil to a chassis according to an example embodiment. Other operations, orders of operations and embodiments may also be provided.

More specifically, FIG. 10 shows a plurality of operations to obtain an integrated chassis structure such as shown in FIGS. 8-9.

In operation 252, a plastic part may be molded. For example, the chassis may be molded in operation 252.

In operation 254, mask areas may be painted on the plastic part. The mask areas may be painted on the inner surface of the chassis. The mask areas may be painted where the metal deposition will not occur (i.e., an inverse of the metal deposition).

In operation 256, a surface of the plastic part (or chassis) may be activated so as to encourage adhesion of printing.

In operation 258, electro-less plating of copper may be provided to the plastic part. The chassis may receive the coil and the collector plate by electro-less plating of the coil.

In operation 260, electro-plating of copper may be performed to the plastic part. The coil and the collector plate may thereby be integrated to the chassis.

In operation 262, paint may be provided on the plastic part, such as on the collector plate. This may be done to hide the collector plate.

The controller board and the ferrite layer may then be provided over the integrated structure that includes the coil and the collector plate electro-plated to the chassis. In at least one embodiment, the controller board and/or the ferrite layer may be provided to the structure at a different time point. For this embodiment involving metal deposition, the ferrite layer and the controller board may be added only after the metal deposition process.

The result of operations 252-262 may be the integrated chassis structure shown in FIGS. 8-9.

The following examples pertain to further embodiments.

Example 1 is a method of forming a wireless charging device, comprising: providing a coil for wireless charging, providing a collector plate, and injection molding the coil and the collector plate to a chassis of the wireless charging device to form an integrated chassis.

In Example 2, the subject matter of Example 1 can optionally include providing the coil includes stamping the coil.

In Example 3, the subject matter of Example 1 can optionally include providing the collector plate includes stamping the collector plate.

In Example 4, the subject matter of Example 1 can optionally include injection molding the coil and the collector plate includes insert molding the coil and the collector plate to the chassis of the wireless charging device.

In Example 5, the subject matter of Example 1 and Example 4 can optionally include insert molding the coil and the collector plate to the chassis includes: attaching the coil to a structural carrier to form a structural assembly; and insert molding the structural assembly to the chassis to form an injection molded housing.

In Example 6, the subject matter of Example 1 and Example 5 can optionally include the structural assembly is a non-conductive material.

In Example 7, the subject matter of Example 1 and Example 5 can optionally include insert molding the coil and the collector plate to the chassis further includes: attaching the collector plate to the injection molded housing.

In Example 8, the subject matter of Example 1 and Example 7 can optionally include insert molding the coil and the collector plate to the chassis further includes: painting over the collector plate.

In Example 9, the subject matter of Example 1 can optionally include injection molding the coil and the collector plate includes: attaching the coil and the collector plate to the chassis to form a single structural assembly; and insert molding the single structural assembly to the chassis.

In Example 10, the subject matter of Example 1 can optionally include providing a ferrite layer on the coil.

In Example 11, the subject matter of Example 1 can optionally include providing a controller board on the chassis.

In Example 12, the subject matter of Example 1 and Example 11 can optionally include the controller board is provided on the collector plate such that the collector plate is between the chassis and the controller board.

In Example 13, the subject matter of Example 1 can optionally include the coil is a copper coil.

In Example 14, the subject matter of Example 1 can optionally include the collector plate is copper.

In Example 15, the subject matter of Example 1 can optionally include the chassis is formed of plastic.

Example 16 is a method of forming a wireless charging device, comprising: providing a chassis of the wireless charging device; providing an electro-less plating of a coil to the chassis; and providing an electro-plating of the coil to the chassis to integrate the coil to the chassis and provide an integrated chassis.

In Example 17, the subject matter of Example 16 can optionally include providing an electro-less plating of a collector plate to the chassis; and providing electro-plating of the collector plate to the chassis to integrate the collector plate to the integrated chassis.

In Example 18, the subject matter of Example 16 and Example 17 can optionally include painting over the collector plate.

In Example 19, the subject matter of Example 16 can optionally include providing the chassis includes molding the chassis.

In Example 20, the subject matter of Example 16 and Example 19 can optionally include providing mask areas on the chassis.

In Example 21, the subject matter of Example 16 and Example 20 can optionally include the mask areas are provided on an inner surface of the chassis.

In Example 22, the subject matter of Example 16 can optionally include providing a ferrite layer on the coil.

In Example 23, the subject matter of Example 16 can optionally include providing a controller board on the chassis.

In Example 24, the subject matter of Example 16 and Example 23 can optionally include the controller board is provided such that a collector plate is between the chassis and the controller board.

In Example 25, the subject matter of Example 16 can optionally include the coil is a copper coil.

In Example 26, the subject matter of Example 16 can optionally include the collector plate is copper.

In Example 27, the subject matter of Example 16 can optionally include the chassis is formed of plastic.

Example 28 is an electronic device to provide wireless charging, comprising: a chassis having a power receiving unit to wirelessly receive power, the power receiving unit includes a charging coil and a collector plate integrated into the chassis.

In Example 29, the subject matter of Example 28 can optionally include the collector plate includes copper.

In Example 30, the subject matter of Example 28 can optionally include the coil is a copper coil.

In Example 31, the subject matter of Example 28 can optionally include the chassis is formed of plastic.

In Example 32, the subject matter of Example 28 can optionally include the collector plate is substantially planar with the charging coil.

In Example 33, the subject matter of Example 28 can optionally include the power receiving unit is directly insert molded into the chassis.

In Example 34, the subject matter of Example 28 can optionally include the chassis has a first surface that defines a first plane and a second surface that defines a second plane.

In Example 35, the subject matter of Example 28 and Example 34 can optionally include the coil is provided at the chassis between the first plane and the second plane.

In Example 36, the subject matter of Example 28 and Example 34 can optionally include the collector plate is provided between the first plane and the second plane.

In Example 37, the subject matter of Example 28 and Example 36 can optionally include paint on the collector plate.

In Example 38, the subject matter of Example 28 can optionally include the power receiving unit includes a ferrite layer.

In Example 39, the subject matter of Example 28 and Example 38 can optionally include the ferrite layer is provided on the coil.

In Example 40, the subject matter of Example 28 and Example 39 can optionally include the ferrite layer is provided between the coil and the first plane of the chassis.

In Example 41, the subject matter of Example 28 and Example 38 can optionally include an insulating layer is provided between the coil and the ferrite layer.

In Example 42, the subject matter of Example 28 can optionally include the power receiving unit includes a controller board.

In Example 43, the subject matter of Example 28 and Example 42 can optionally include the controller board is on the collector plate.

In Example 44, the subject matter of Example 28 and Example 42 can optionally include the power receiving unit includes a connector, and the coil is connected to the controller board by the connector.

In Example 45, the subject matter of Example 28 can optionally include a battery to receive the power.

In Example 46, the subject matter of Example 28 can optionally include a load to receive the power.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of forming a wireless charging device, the method comprising:
   providing a coil for wireless charging;
   providing a collector plate; and
   injection molding the coil and the collector plate to a chassis of the wireless charging device to form an integrated chassis.

2. The method of claim 1, wherein the providing a coil includes stamping the coil.

3. The method of claim 1, wherein the providing a collector plate includes stamping the collector plate.

4. The method of claim 1, wherein the injection molding the coil and the collector plate includes inserting molding of the coil and the collector plate to the chassis of the wireless charging device.

5. The method of claim 4, wherein the inserting molding of the coil and the collector plate to the chassis includes:
attaching the coil to a structural carrier to form a structural assembly; and
insert molding the structural assembly to the chassis to form an injection molded housing.

6. The method of claim 5, wherein the inserting molding of the coil and the collector plate to the chassis further includes:
attaching the collector plate to the injection molded housing.

7. The method of claim 1, wherein the injection molding the coil and the collector plate includes:
attaching the coil and the collector plate to the chassis to form a single structural assembly; and
insert molding the single structural assembly to the chassis.

8. The method of claim 1, further comprising providing a ferrite layer on the coil.

9. The method of claim 1, further comprising providing a controller board on the chassis.

10. The method of claim 9, wherein the controller board is provided on the collector plate such that the collector plate is between the chassis and the controller board.

11. A method of forming a wireless charging device, the method comprising;
providing a chassis of the wireless charging device;
providing an electro-less plating of a coil to the chassis; and
providing an electro-plating of the coil to the chassis to integrate the coil to the chassis and provide an integrated chassis.

12. The method of claim 11, further comprising:
providing an electro-less plating of a collector plate to the chassis; and
providing electro-plating of the collector plate to the chassis to integrate the collector plate to the integrated chassis.

13. The method of claim 11, further comprising providing mask areas on the chassis.

14. The method of claim 13, wherein the mask areas are provided on an inner surface of the chassis.

15. An electronic device to provide wireless charging, the electronic device comprising:
a chassis having a power receiving unit to wirelessly receive power, the power receiving unit including a charging coil and a collector plate integrated into the chassis;
wherein the power receiving unit includes a controller board disposed on the collector plate.

16. The electronic device of claim 15, wherein the collector plate is substantially planar with the charging coil.

17. The electronic device of claim 15, wherein the power receiving unit is directly insert molded into the chassis.

18. An electronic device to provide wireless charging, the electronic device comprising:
a chassis having a power receiving unit to wirelessly receive power, the power receiving unit including a charging coil and a collector plate integrated into the chassis;
wherein the chassis has a first surface that defines a first plane and a second surface that defines a second plane, wherein the coil is provided at the chassis between the first plane and the second plane, and wherein the collector plate is provided between the first plane and the second plane.

19. The electronic device of claim 18, wherein the power receiving unit includes a ferrite layer, wherein the ferrite layer is provided between the coil and the first plane of the chassis, and wherein an insulating layer is provided between the coil and the ferrite layer.

* * * * *